(12) United States Patent
Kinashi et al.

(10) Patent No.: US 6,463,366 B2
(45) Date of Patent: Oct. 8, 2002

(54) ATTITUDE DETERMINATION AND ALIGNMENT USING ELECTRO-OPTICAL SENSORS AND GLOBAL NAVIGATION SATELLITES

(76) Inventors: Yasuhiro Kinashi, 10425 Mount Sunnpre Rd., Vienna, VA (US) 22187; David Salazar, 2505 Cranfield Rd., Hampton Cove, AL (US) 35763

( * ) Notice: Subject to any disclaimer, the term of this patent is extended or adjusted under 35 U.S.C. 154(b) by 0 days.

(21) Appl. No.: 09/803,620

(22) Filed: Mar. 12, 2001

(65) Prior Publication Data

US 2002/0004691 A1 Jan. 10, 2002

Related U.S. Application Data

(60) Provisional application No. 60/188,204, filed on Mar. 10, 2000.

(51) Int. Cl.[7] .............................................. G06F 19/00
(52) U.S. Cl. ............................. 701/13; 701/4; 701/220; 342/357.14
(58) Field of Search .............................. 701/13, 4, 213, 701/214, 215, 216, 220; 342/357.01, 357.06, 357.08, 357.11, 357.14

(56) References Cited

U.S. PATENT DOCUMENTS

| | | | |
|---|---|---|---|
| 5,296,861 A | 3/1994 | Knight | 342/357.11 |
| 5,319,969 A * | 6/1994 | Billing-Ross et al. | 73/178 R |
| 5,347,286 A | 9/1994 | Babitch | 342/359 |
| 5,446,465 A | 8/1995 | Diefes et al. | 424/449 |
| 5,506,588 A | 4/1996 | Diefes et al. | 342/357.11 |
| 5,534,875 A | 7/1996 | Diefes et al. | 342/357.11 |
| 5,543,804 A | 8/1996 | Buchler et al. | 342/357.08 |
| 5,546,309 A * | 8/1996 | Johnson et al. | 364/434 |
| 5,548,293 A | 8/1996 | Cohen | 342/357.11 |
| 5,561,432 A | 10/1996 | Knight | 342/357.11 |
| 5,568,152 A | 10/1996 | Janky et al. | 342/357.08 |
| 5,572,218 A | 11/1996 | Cohen et al. | 342/357.06 |
| 5,583,513 A | 12/1996 | Cohen | 342/357.06 |
| 5,619,212 A | 4/1997 | Counselman, III | 342/357.06 |
| 5,726,659 A | 3/1998 | Kee et al. | 342/352 |
| 5,777,578 A | 7/1998 | Chang et al. | 342/357.06 |
| 5,805,200 A | 9/1998 | Counselman, III | 342/357.08 |
| 5,831,572 A | 11/1998 | Damilano | 342/352 |
| 5,899,945 A | 5/1999 | Baylocq et al. | 701/4 |
| 5,917,448 A | 6/1999 | Mickelson | 342/442 |
| 5,918,161 A | 6/1999 | Kumar et al. | 455/65 |
| 5,933,110 A | 8/1999 | Tang et al. | 342/357.11 |
| 5,943,008 A | 8/1999 | Van Dusseldorp | 701/213 |
| 5,959,576 A | 9/1999 | Ring | 342/357.11 |
| 5,963,166 A | 10/1999 | Kamel | 342/357.01 |
| 6,005,514 A | 12/1999 | Lightsey | 342/365 |
| 6,142,423 A * | 11/2000 | Wehner | 244/164 |
| 6,246,960 B1 * | 6/2001 | Lin | 701/214 |
| 6,278,945 B1 * | 8/2001 | Lin | 701/216 |
| 6,331,835 B1 * | 12/2001 | Gustadson et al. | 342/357.06 |

OTHER PUBLICATIONS

Article entitled "Real–Time Atitutude And Heading Determination Using GPS" by Frank van Graas and Michael S. Braasch in the Mar. 1992 edition of *GPS World*.

* cited by examiner

*Primary Examiner*—Tan Nguyen

(57) ABSTRACT

An attitude determination and alignment method and system use electro-optical sensors and global navigation satellites to determine attitude knowledge for a spacecraft, satellite, or a high-altitude aircraft. An on-board inertial navigation system uses global navigation satellite system equipment and an attitude determination system uses an electro-optical sensor. The electro-optical sensor view the navigation satellites as surrogate stellar reference sources. The electro-optical sensor replaces the function of a star sensor or tracker and associated processing required for an onboard attitude determination system. Navigation and timing information generated by the GPS/GNSS-INS is used to perform required attitude determination system functions.

26 Claims, 7 Drawing Sheets

ATTITUDE DETERMINATION AND ALIGNMENT USING ELECTRO-OPTICAL SENSORS AND GLOBAL NAVIGATION SATELLITES

CROSS REFERENCE TO RELATED APPLICATIONS

The subject application claims priority of co-pending provisional patent application No. 60/188,204 filed Mar. 10, 2000.

BACKGROUND OF THE INVENTION

The invention relates to state estimation of vehicles such as high-altitude aircraft, spacecraft and satellites. More particularly, the invention relates to an attitude determination and alignment system for vehicles such as low-earth orbiting spacecraft or high-flying aircraft using electro-optical sensor devices and navigation satellites in a global positioning satellite system.

Spacecraft, aircraft, and satellites must accurately determine absolute orientation (i.e., pitch, yaw, and roll) to realign their onboard Attitude Control System ("ACS") and correct for instrument drift and buildup of errors affecting accurate and precise attitude determination. Attitude control is of particular importance in aircraft to maintain a stable operating environment, in surveillance satellites to track another object in space, and in remote imaging satellites to provide precise earth imaging and reconnaissance.

Prior methods have been developed to perform ACS functions. For example, one such method measures angular positions of stars and compares those measurements to known quantities. Kamel, U.S. Pat. No. 5,963,166, provides a spacecraft camera image navigation and registration system to point a satellite and camera. An onboard computer performs calculations based upon information from a star tracker, gyro, and earth-based sensor data to determine the attitude of the satellite. However, Kamel requires the use of star tracker equipment to detect stars in the ever-changing area above the satellite. The star tracker compares detected star positions with a star table and then determines vehicle attitude from the detected star positions. While a star tracker provides attitude accuracy on the order of 5 to 20 $\mu$ radians, the star tracker equipment required to detect the faint star light and maintain the star tables is costly.

Ring, U.S. Pat. No. 5,959,576 provides a satellite attitude determination system using a global positioning system ("GPS") and line of sight communication instead of star tracker equipment. Ring provides a dual-axis pointing laser receiver on one satellite and laser transmitters on other satellites to determine relative azimuth and elevation. The relative orientation is combined with Global Navigation Satellite System ("GNSS") position data to determine the attitude of the satellite. Ring provides attitude determination for a communication satellite without the use of star tracker equipment. However, Ring's design concept provides coarse attitude accuracy using radar signals, not suitable for applications requiring greater accuracy, such as remote imaging or surveillance satellites. Although it can provide accurate attitude determination using laser communication links, it is potentially very complex and costly.

Van Dusseldorp, U.S. Pat. No. 5,943,008, exemplifies an attitude determining system utilizing a GPS. According to Van Dusseldorp, at least three sets of signals are respectively received from three antennas onboard a vehicle. Each signal is received in a separate time domain slot, with each signal respectively receiving information from a respective satellite on a separate dedicated channel. However, multiple antenna GPS systems provide relatively coarse attitude accuracy, on the order of 1 milli-radian at best, and therefore may not be used in applications requiring greater accuracy, such as in remote imaging satellites or surveillance satellites.

Techniques such as those described above and existing interferometric GPS attitude determination methods using multiple antennas are complex and expensive, or provide only coarse information with milli-radian accuracy.

SUMMARY OF THE INVENTION

Recently, the U.S. Air Force has completed deployment of the Global Positioning System ("GPS") Block II constellation of 24 satellites. Russia has similarly deployed a global navigation satellite system GLONASS in a similar orbit constellation. Currently 10 of 18 satellites are operational with a full constellation being 30 satellites. European Space Agency ("ESA") is scheduled to develop yet another GPS/GNSS, based of a constellation of 30 Galileo satellites. The position and motion of these satellites, by the very nature of their mission, are known to high precision and the satellites are uniformly distributed about the celestial sphere relative to the center of the earth. If the relative angular position of a navigational satellite can be measured relative to spacecraft axes then these satellite constellations can be used as surrogate calibration stars for the purpose of the attitude determination and alignment updates.

The design approach introduced herein extends the capability of the GPS/GNSS to perform satellite attitude calibration using an on-board electro-optical sensor to determine the three-axis alignment errors of the spacecraft ACS. This design replaces a traditional star tracker, eliminating the need for maintaining data memory for a calibrated star catalog. As illustrated and summarized in FIG. 1, the present invention using a Navstar GPS inertial navigation system ("INS") works as follows:

A spacecraft vehicle equipped with a GPS receiver unit has a worldwide navigational capability to compute an absolute position and velocity with an instantaneous accuracy of less than 16 meters (SEP) and 0.1 meter/second (1$\sigma$), without the aid of additional instruments or external reference sources. Also, by extracting the ephemerides of the GPS satellites contained in the GPS broadcast signal, the location of each GPS satellite is available with an accuracy of 8 meters (SEP). The accuracy of the data can be improved to one meter or less by implementing an integrated Kalman filter solution over a time period. Having very precise and accurate knowledge of both the vehicle and all GPS satellites in view, the pointing vector to each GPS satellite can be computed versus time to sub-microradian accuracy.

Nominally, two GPS satellites, with a sufficient geometric separation, are selected for pointing an on-board visible or equivalent electro-optical sensor. The GPS satellites can be simultaneously or sequentially viewed and tracked by the sensor over a nominal time period.

The sensor is pointed by reorienting the sensor line-of-sight with respect to on-board attitude data derived by an inertial measurement unit ("IMU") or similar measurement device, such as a 3-axis magnetometer. This may be accomplished in several ways. FIG. 8 illustrates a sensor on a gimbaled mount. Reorienting the vehicle is required when using a strap-down sensor. Yet other approaches are also applicable, such as mounting multiple strap-down sensors is particularly illustrated in FIG. 1. For operation in the strap-down sensor configuration, a predication must be made of when satellite viewing will occur. For optical or ultraviolet viewing of each GPS satellite, the satellite is allowed to streak across a camera in the form of a sensor focal plane array.

The present invention provides attitude determination and alignment of a moving vehicle using electro-optical sensors and global navigation satellites without use of star tracker equipment. An attitude determination and alignment system for low earth orbit ("LEO") satellites and high-flying aircraft determines vehicle orientation within micro-radians and at a significantly lower cost than comparable star tracker equipment. The present invention extends capability in existing global navigation satellite systems, such as Navstar GPS, that perform inertial navigation and timing by implementing a unique attitude determination and update technique. The present invention includes one or more electro-optical sensors to view and measure navigation satellites as surrogate calibration stellar sources. The use of a star catalog, required by star tracker systems, is replaced by computing real-time pointing vectors to the navigational satellites. The pointing vectors are computed by projecting accurate inertial positions of the subject vehicle, equipped with a GPS/GNSS receiver and an inertial navigation system ("INS"), and navigational satellites. System performance of the present invention is related to measurement precision of sensor instruments aboard the vehicle. Hence, a pointing accuracy on the order of a few micro-radians can be achieved even without the use of star tracker equipment.

DETAILED DESCRIPTION

Figure 1:
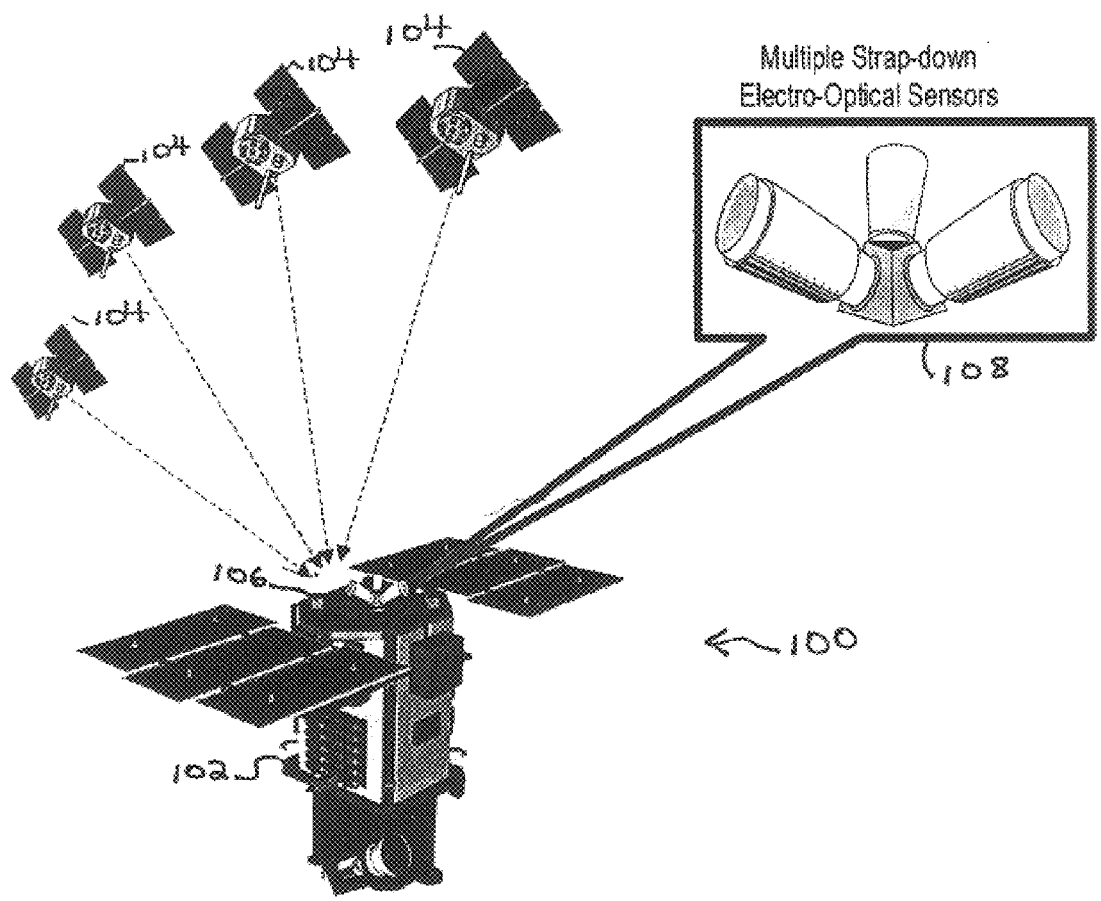
FIG. 1 is an elevated perspective view of an attitude determination system according to an embodiment of the present invention.

FIG. 1 is an elevated perspective view of an attitude determination system 100 incorporated into vehicle 102 and cooperating with a plurality of satellites 104 in a global positioning system ("GPS") according to an embodiment of the present invention. Vehicle 102, according to an embodiment of the present invention, is a satellite. According to a more particular embodiment of the present invention, vehicle 102 is a low earth orbit ("LEO") satellite including a GPS antenna 106 and multiple strap down electro-optical sensors 108. As set forth in greater detail below, a gimbal-mounted electro-optical sensor may be substituted for the multiple strap down electro-optical sensors 108. Antenna 106 is particularly a GPS/GNSS antenna for receiving navigational and timing information and strap down sensors 108 are electro-optical sensors for detecting and tracking navigation satellites.

Figure 2:
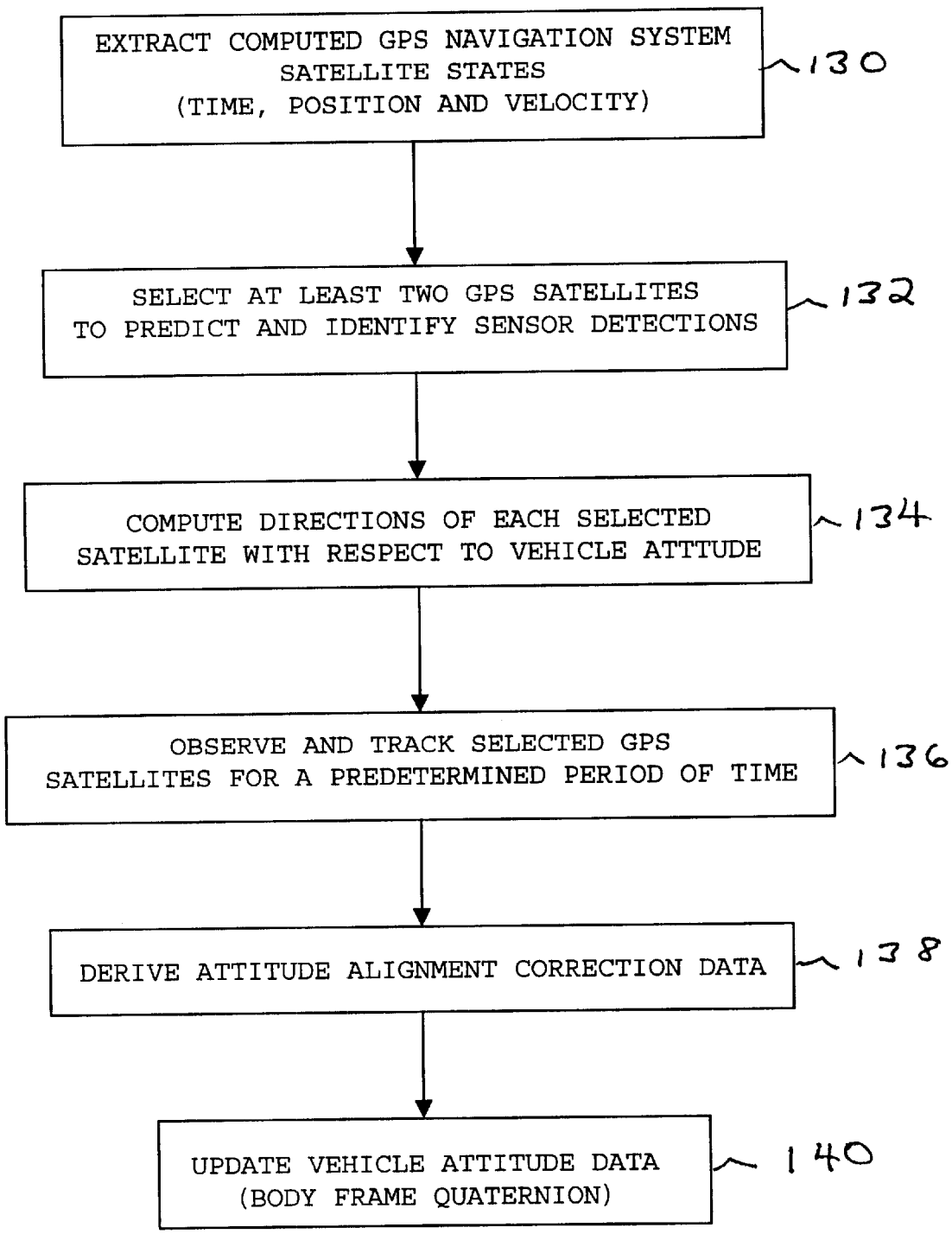
FIG. 2 is a flow chart of a method of determining attitude and alignment in a vehicle using GPS.

FIG. 2 is a flow chart of a method of determining attitude in a vehicle using GPS. According to operation 130, a plurality of satellite states (i.e., time, position, and velocity information) are extracted from satellites in a GPS. In operation 132, nominally two GPS satellites are selected to predict and identify sensor detections. According to an embodiment of the present invention, operation 132 predicts and identifies optical detections from the GPS satellites. According to an alternate embodiment, operation 132 predicts and identifies ultra-violet ("UV") detections. In operation 134, directions of each of the selected satellites are computed with respect to the attitude of the subject vehicle. The selected satellites must be separated by a minimum angle.

In operation 136, the selected GPS satellites are observed and tracked for a predetermined period of time. In particular, streak detection of an optical or UV signal is performed by a camera incorporating a focal plane array ("FPA"). Each measurement period for each selected satellite is limited by vehicle dynamics. In operation 138, attitude alignment correction data is derived. According to an embodiment of the present invention, a linear least squares solution is used for streak detection. Further, a non-linear least-squares method is used to determine errors in the alignment data. In operation 140, vehicle attitude data is updated. In particular, eight parameters including parameters for vehicle attitude bias and the rate of change in vehicle attitude bias are determined.

Figure 3:
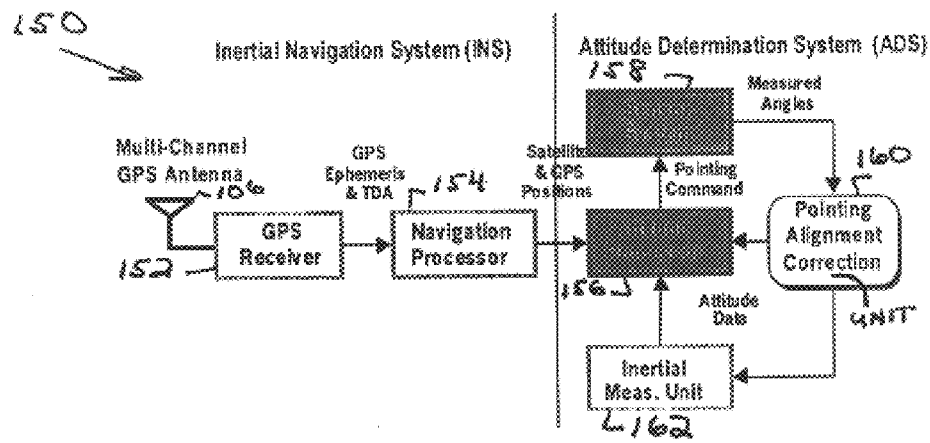
FIG. 3 is a block diagram of an inertial navigation system cooperating with an attitude determination system according to an embodiment of the present invention.

FIG. 3 is a block diagram of an inertial navigation system ("INS") 150 cooperating with an attitude determination system 100 according to an embodiment of the present invention. As illustrated, attitude determination system ("ADS") 100 communicates satellite and GPS positions with INS 150. In particular, multiple-channel GPS antenna 106 receives and communicates information to GPS receiver 152. GPS ephemeris and time difference or arrival ("TDA") are then communicated to navigation processor 154. Navigation processor 154 communicates the information to ADS 100, and in particular to attitude processor 156. Attitude processor 156 then provides a pointing command to sensor system 158, which in turn provides measured angles to pointing alignment correction unit 160. The pointing alignment correction unit 160 outputs data to attitude processor 156 directly and also indirectly by way of inertial measurement unit ("IMU") 162. IMU 162 provides attitude data to attitude processor 156. The processing blocks 154, 156 and 160 can be hosted in a single integrated processor system according to an embodiment of the present invention.

Figure 4:
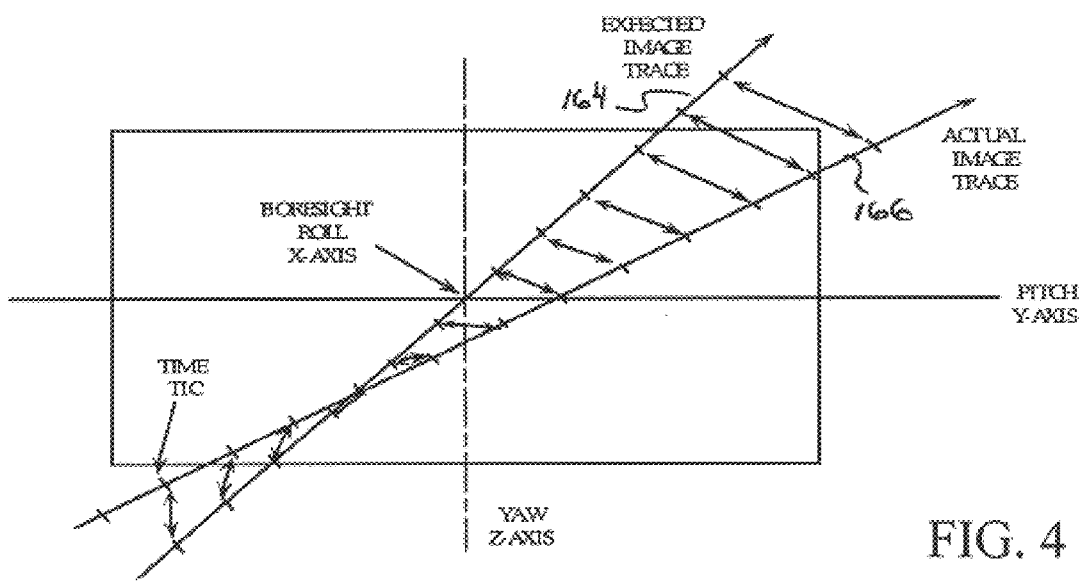
FIG. 4 is graph illustrating a deviation between an expected satellite image trace and an actual satellite image trace from a particular satellite in a GPS.

FIG. 4 is a graph illustrating a deviation between an expected satellite image trace and an actual satellite image trace from a particular satellite in a GPS. As illustrated, pitch is represented by the Y axis, yaw is represented by the Z axis, and bore sight roll is provided around the X axis. Thus, the expected image trace 164 is aligned onto the X axis, whereas the actual image trace 166 is detected in three dimensional space with respect to the expected image trace. Cross hatching in each of image trace 164 and image trace 166 indicate units of time, i.e. time tics. Thus, FIG. 4 illustrates a technique for comparing an actual image trace (i.e. focal plane image trace) 166 of a navigational satellite across a sensor field-of-view with an expected (i.e. predicted) image trace 164 computed from on-board navigation information generated by a GPS/GNSS-INS 150.

As illustrated in FIG. 4, attitude alignment error is quantified by processing the measured GPS image trace on the sensor focal plane with the predicted image trace computed from the GPS navigation and IMU data. The difference between the two image traces is the basis for determining the attitude alignment error and updating the IMU calibration. The alignment correction data is derived using a linear regression on the streak detection, and applying a non-linear least-square solution to determine quaternion errors. The new information is used to update the vehicle frame quaternion, such that eight (8) parameters for both the bias and rate of change in the bias are determined.

Bias is defined to be the difference between the true and the measured value of a quaternion parameter. Bias rate is simply the time rate of change of bias. These parameters are estimated at the end time of the sensor observation interval. The corrected quaternion values are determined from the measured quaternions and the estimated bias.

Figure 5:
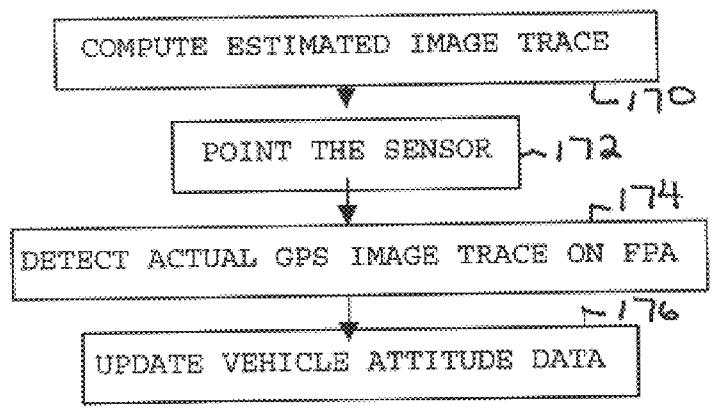
FIG. 5 is a flow chart of a method of updating vehicle attitude data according to an embodiment of the present invention.

FIG. 5 is a flow chart of a method of updating vehicle attitude data according to an embodiment of the present invention, and particularly corresponds to the graphically illustrated deviation in FIG. 4. In operation 170, an estimated image trace is computed. More particularly, a reference pointing vector is determined from vehicle state vectors and an on-board IMU 162. In operation 172, a sensor onboard a vehicle is pointed in the direction of the GPS satellite, preferably using optical or UV sensing. In operation 174, an actual GPS satellite image trace is detected by a camera having a focal plane array. The focal plane array is particularly a charge-coupled device ("CCD") formed as part of the camera. For streak detection, a least squares fit to pixel measurements is performed with respect to time. In operation 176, vehicle attitude data is updated according to a calibration process. Alignment is forced through roll axis correction, i.e. the angle between estimated and actual traces. Correct pitch and yaw are acquired by aligning time tics in two-dimensions, and by applying a non-linear least squares fit. The 8 quaternion parameters of the vehicle are then updated for the vehicle attitude bias and rate of change in the vehicle attitude bias.

A measurement estimate is determined by generating a series of azimuth, elevation points that would be expected from the observation of a navigation satellite. The azimuth and elevation position of a navigation satellite in the sensor's field of view is determined as follows. First determine the ECI position vector of the navigation satellite relative to the sensor at a specified time. Next rotate the ECI vector to the body frame using the current estimate of the quaternions. Now rotate to the sensor bore-sight coordinate system depending on where the sensor is pointed. Lastly, calculate the azimuth and elevation in the bore-sight coordinate system.

Two classical filtering processes are implemented to extract information regarding the state of the system from measurement data. The first is sequential processing using a Kalman filter; the second is batch processing using a batch filter. The batch filter is an implementation of Marquardt's method of nonlinear least squares. The nonlinear least squares parameter estimate update equation is given by:

$$X_{n+1} = X_n + (J^T W^{-1} J)^{-1} J^T W^{-1} [Y - f(X_n, S, G)] \quad (1.0)$$

$X_{n+1}$ is the updated bias and bias rate parameter estimate derived from the prior estimate $X_n$ and the difference between the measurement parameters Y and the measurement estimates $f(X_n, S, G)$. S is sensor position and velocity, G is GPS satellite position and velocity, W is a measurement covariance, and J is partial derivatives of f with respect to $X_n$. Marquardt's method is in a sense an interpolation between the Gauss-Newton method and the method of steepest descent. The method is implemented by multiplying the diagonal elements of $[J^T W^{-1} J]$ by $1+\lambda$. This method approaches the Gauss-Newton method if $\lambda$ approaches zero and the method of steepest descent if $\lambda$ approaches infinity. In addition, the step size increases as $\lambda$ gets smaller and decreases as $\lambda$ gets larger. The strategy is to decrease $\lambda$ if the solution is converging and to increase $\lambda$ if it is diverging. This method thus has the ability to converge from a distant initial estimate, and also the ability to converge rapidly once the vicinity of the solution is reached. The Marquardt method is particularly illustrated in the present invention below.

Figure 6:
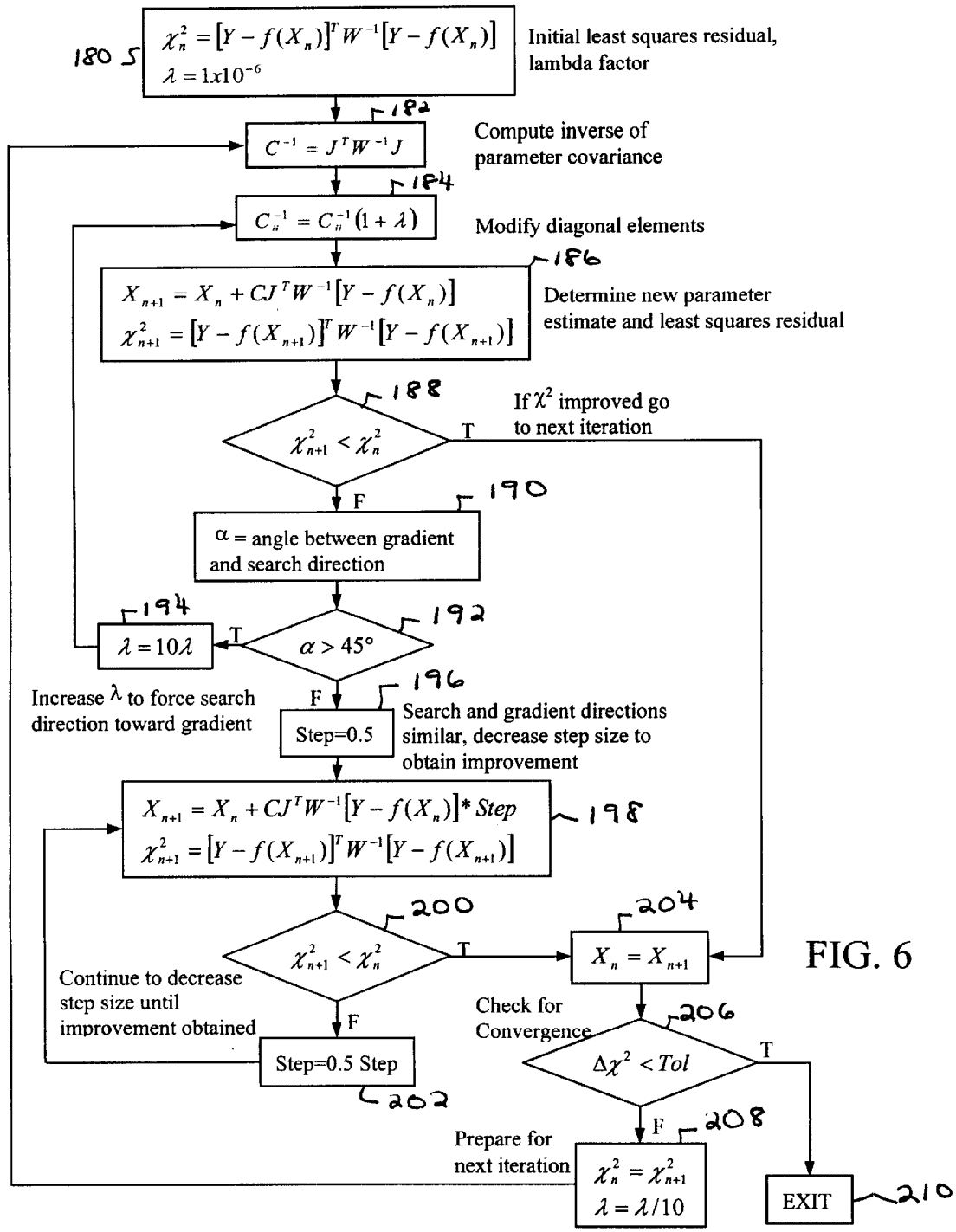
FIG. 6 is a flow chart of a Marquardt's method for calculating a non-linear least squares estimate in a batch filtering process.

FIG. 6 is a flow chart of a method for the implementation of a Marquardt's method of non-linear least squares estimation in a batch filtering process. FIG. 6 provides both a grouping of operations for executing the Marquardt's method and a grouping of corresponding mathematical operations to be executed by a computer. In operation 180, an initial least squares fit and lambda factor are determined. In operation 182 an inverse of parameter covariance is computed, while in operation 184 diagonal elements are modified. In operation 186, new parameter estimates are determined and a least squares residual is provided. Flow next proceeds to operation 188, wherein a determination is made to proceed to a next iteration if an $X^2$ term is improved.

In operation 190, an angle between gradient and a search direction is determined. In operation 192, if the angle determined in operation 190 is less than 45°, flow proceeds to operation 196, otherwise, flow proceeds to operation 194 and the value of $\lambda$ is multiplied by 10 for further iteration in operation 184.

In operation 196, a step is set to 0.5 and in operation 198, if search and gradient directions are similar, a decrease in step size is made to obtain improvements. Operations 200 and 202 loop to decrease step size until an improvement is obtained. Once an improvement is obtained as identified by operation 200, the parameter estimate is saved in operation 204 and convergence is checked in operation 206. If there is convergence, flow ends with operation 210, else, preparation is made for a subsequent iteration in operation 208.

Figure 7:
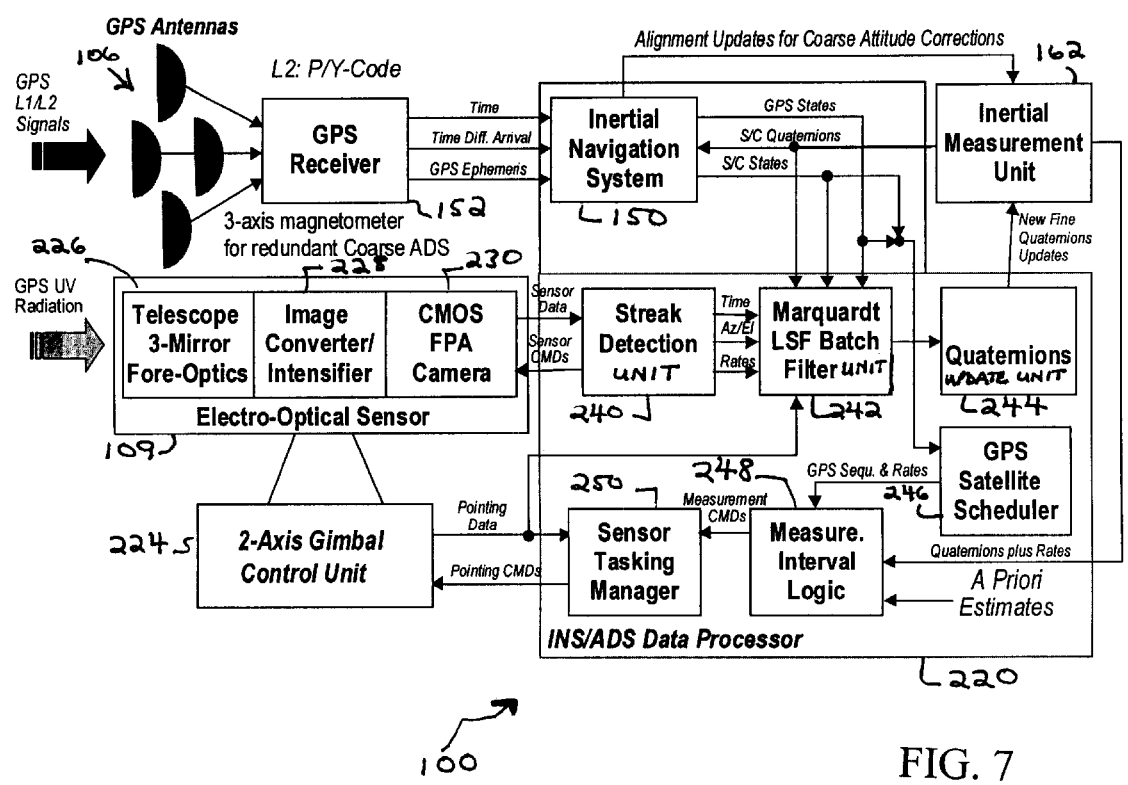
FIG. 7 is functional block diagram illustrating an INS/ADS data processor communicating with GPS antennas and gimbaled controlled sensor in an attitude determination system according to an embodiment of the present invention.

FIG. 7 is functional block diagram illustrating an INS/ADS data processor 220 communicating with GPS antennas 106 and gimbal control unit 224 in attitude determination system 100 according to an embodiment of the present invention. FIG. 7 represents a gimbaled sensor payload design approach. For a strap-down sensor design approach, such as illustrated in FIG. 1 and set forth in greater detail below, a sensor tasking manager is provided instead of generating pointing commands ("pointing data") for gimbaled optical sensor 109. For sensor tasking manager 250, a sequence of sensor detection windows would be generated for extracting satellite measurement data from a sensor data stream. FIG. 7 further illustrates multiple GPS/GNSS antennas (GPS antennas 106) for performing a coarse attitude determination for initiating the system functions. This can be selectively replaced by a sun sensor or other coarse reference measurement device.

FIG. 7 illustrates attitude determination system 100 with gimbaled electro-optical sensor 109. Sensor 109 includes telescope 3-mirror fore optics 226, an image converter/intensifier 228, and a camera 230. According to a particular embodiment of the present invention, camera 230 is CMOS focal plane array ("FPA").

The output from camera 230 is provided to streak detection unit 240, and then data is provided to Marquardt LSF Batch Filter unit 242. Filter unit 242 executes the flow method illustrated in FIG. 6. Next, the quatemions of the vehicle are updated in accordance with the output from filter unit 242 by quaternions update unit 244.

GPS satellite scheduler 246 receives signal data from inertial navigation system 150 and outputs GPS sequence and rate data to measurement and interval logic unit 248. Logic unit 248 then outputs commands to sensor tasking manager 250, which then outputs pointing commands to control unit 224. Likewise, tasking manager 250 receives pointing data from control unit 224.

FIG. 7 provides an integrated system design and the algorithm design solution is unique source. According to the present invention, the integrated system design employs 1) electro-optical sensors, either gimbal-mounted assembly shown in FIG. 8 or fixed strap-down assembly shown in FIG. 11, to view the GPS and other navigation satellites as a calibration source, and 2) an operation performing vehicle attitude alignment calibration updates autonomously.

Figure 8:
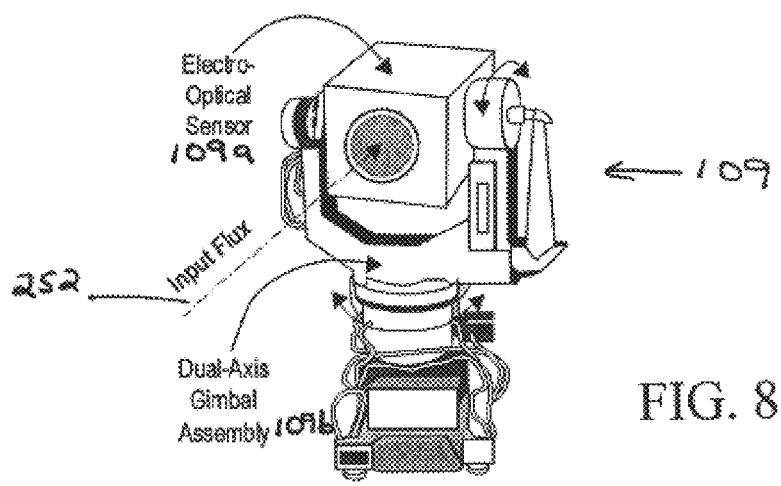
FIG. 8 is a gimbal mounted electro-optic sensor according to an embodiment of the present invention.

FIG. 8 is an elevated perspective view of gimbal mounted electro-optic sensor 109 according to an embodiment of the present invention. As illustrated, input flux 252 is received by electro-optical sensor 109a, which in turn is mounted to dual-axis gimbal assembly 109b. FIG. 8 illustrates characteristics of a typical gimbaled electro-optical sensor 109 as part of a vehicle payload assembly. Since the sensor field of field is fairly small (i.e., on the order of 2 to 4 degrees), the optical configuration is preferably a folded unobscured all-mirror design. A gimbal design assembly is provided as a dual-axis configuration to provide a near hemi-spherical field coverage.

Figure 9:
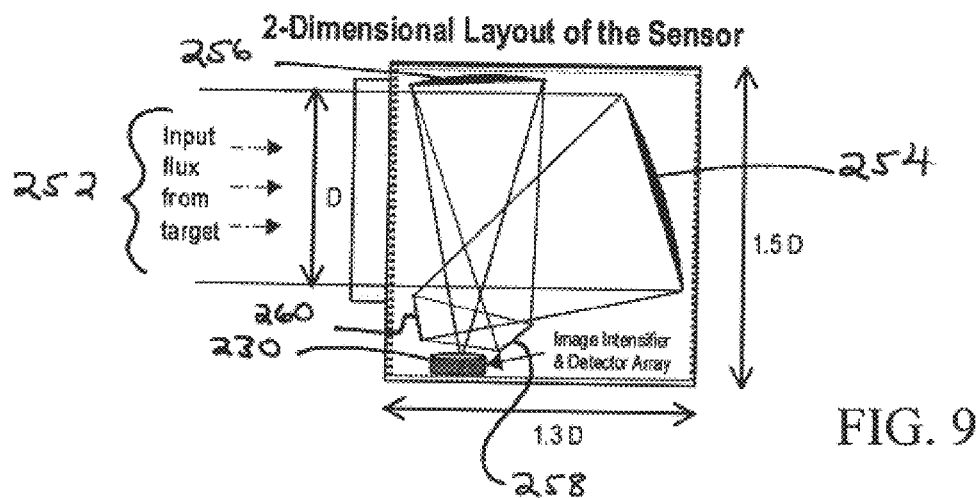
FIG. 9 is a schematic diagram illustrating a two-dimensional sensor layout.

FIG. 9 is a schematic diagram illustrating two-dimensional sensor layout of electro-optical sensor 109a. Input flux 252 is received through input diameter D and is then received by input primary mirror 254. The flux is further enhanced by tertiary mirror 256 before detection by camera (detector array) 230. As illustrated, the flux is further reflected and focused by folding mirror 258 and secondary mirror 260.

Figure 10:
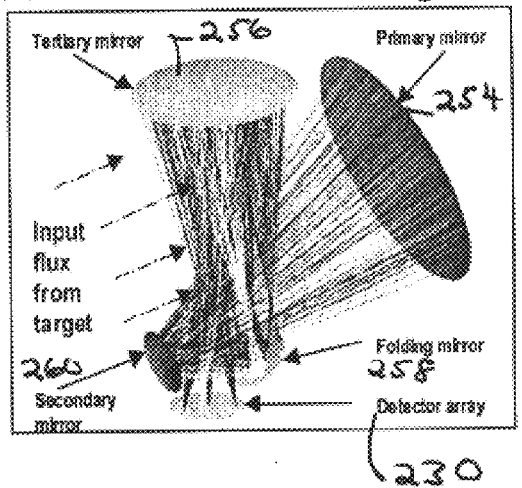
FIG. 10 is a schematic diagram illustrating a folded unobscured mirror configuration.

FIG. 10 is a schematic diagram illustrating a folded unobscured mirror configuration. FIG. 10 is similar to FIG. 9 but further illustrates folding mirror 258 and secondary mirror 260 to enhance flux detection by camera (detector array) 230.

Figure 11:
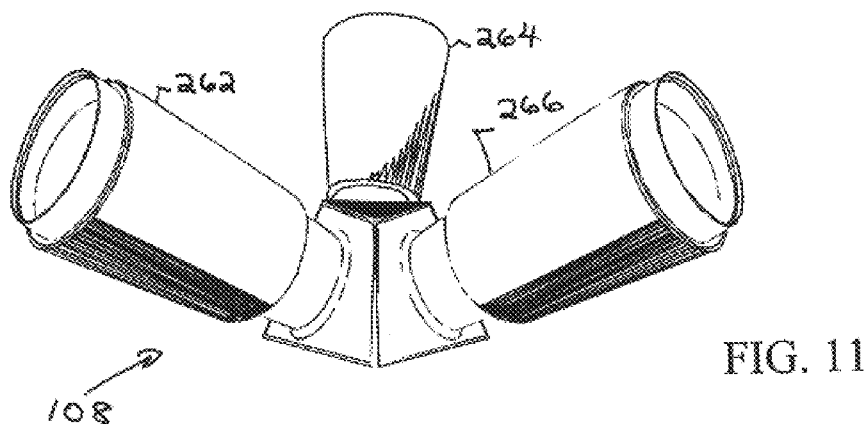
FIG. 11 is an elevated perspective view of strap down electro-optical sensors for mounting on a vehicle.

FIG. 11 is an elevated perspective view of strap down electro-optical sensors 108 for mounting on vehicle 102. As particularly illustrated, sensors 108 include first sensor 262, second sensor 264 and third sensor 266. FIG. 11 illustrates a multiple gimbal-less, strap-down sensor payload design configuration. Since the sensors 262, 264 and 266 are hard-mounted to vehicle 102, a wide field of view ("WFOV") optical telescope design, using all-lens assembly, is required for providing adequate field coverage.

Figure 12:
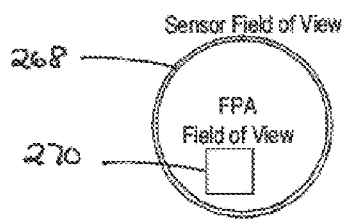
FIG. 12 is a schematic view comparing relative size of a sensor field of view and focal plane array field of view in an electro-optical sensor.

FIG. 12 is a schematic view comparing relative size of a sensor field of view 268 and focal plane array field of view 270.

Figure 13:
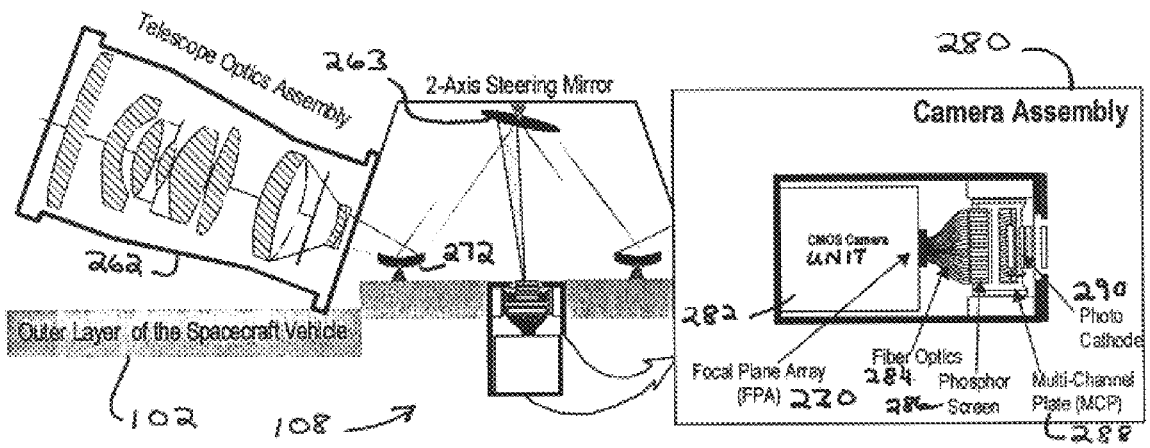
FIG. 13 is a schematic view of strap down electro-optical sensors communicating with a photo cathode in a camera assembly.

FIG. 13 is a schematic view of strap down electro-optical sensors 108 communicating with camera assembly 280 according to an embodiment of the present invention. The aft-telescope design of each sensor, for example 262, is afocal to spread a nearly collimated energy beam onto, for example, mirror 272 near the base of the mount assembly. Of course, each sensor has a corresponding mirror for spreading the collimated energy. Next, as illustrated, a small two-axis steering mirror 263 is incorporated to focus on the image intensifier/camera assembly at the base of the sensor mounting assembly again reflects the reflected energy. Camera assembly 280 includes camera unit 282, which includes focal plane array 230. The focal plane array 230 is connected via fiber optics 284 to phosphor screen 286, which in turn is connected to photo cathode 290 by way of multi-channel plate 288.

Accordingly, it can be seen that the present invention provides a significant improvement in determining the orientation of a low-earth orbiting satellites and high-flying aircraft.

Although the above description above contains many specifics, these should not be construed as limiting the scope of the invention but as merely providing illustrations of some of the presently preferred embodiments. Various other embodiments and ramifications are possible within the scope of the present invention. For example, the pointing and control of the electro-optical sensor can be accomplished either by integrating the sensor on a two-axis gimbaled mount or by strapping one or more sensors down onto the spacecraft and reorienting the entire vehicle. Another example is replacing a relatively expensive IMU equipped with a laser gyro, mounting multiple GPS antennas in plane, and applying a phase-carrier interferometric technique to determine a coarse vehicle orientation, which aids in providing coarse pointing to the navigation satellites.

As this invention may be embodied in several forms without departing from the spirit or principal characteristics thereof, the present embodiments are therefore illustrative and not restrictive. Those skilled in the art will appreciate that changes may be made to these embodiments without departing from the principles and spirit of the invention. Accordingly, the scope of the invention is defined by the appended claims rather than by the description preceding them, and all changes that fall within the metes and bounds of the claims, or equivalents of such metes and bounds thereof, are therefore intended to be embraced by the claims.

What is claimed is:

1. A method for determining attitude information for a vehicle, comprising:

receiving radio-frequency signals from a plurality of navigation satellites;

applying a filter to determine an expected position and motion of the vehicle from the received radio-frequency signals;

determining an expected angular position and motion of one or more satellites relative to the vehicle;

measuring an actual angular position and motion of said one or more satellites about two axes relative to the vehicle using an electro-optical sensor;

computing a difference, along the two axes, between the expected angular position and motion of said one or more satellites and the measured, actual angular position and motion of said one or more satellites; and calculating the attitude information for the vehicle using the computed difference and the expected attitude, attitude rate, position and velocity of the vehicle.

2. The method according to claim 1, further comprising: producing an attitude alignment error to correct for instrument drift rate and accumulated alignment error due to the drift to update attitude knowledge of the vehicle.

3. The method according to claim 1, wherein the filter utilized in said applying operation is a Kalman filter.

4. The method according to claim 1, wherein the filter utilized in said applying operation is a non-linear least squares estimate batch filter.

5. The method according to claim 1, wherein the filter utilized in said applying operation is a Marquardt's method for calculating a non-linear least squares estimate in a batch filtering process.

6. The method according to claim 1, wherein the vehicle is a spacecraft or satellite.

7. The method according to claim 1, wherein the vehicle is a high-altitude aircraft.

8. The method according to claim 1, wherein the vehicle is a low earth orbit spacecraft.

9. The method according to claim 1, wherein the expected position determined in said applying operation is within 10 meters of an actual position.

10. The method according to claim 1, wherein the radio signals received in said receiving step are GPS/GNSS signals, the GPS/GNSS signals are received with a GPS/GNSS antenna/receiver unit, and the received GPS/GNSS signals are processed with an inertial navigation system onboard the vehicle.

11. The method according to claim 1, wherein said determining operation includes performing angular position and rate estimates for pointing a gimbaled electro-optical sensor on board the vehicle toward a navigation satellite, or establishing sensor detection windows for extracting measurement data of strap-down electro-optical sensors.

12. An onboard attitude determination system, comprising:
an optical sensor to receive and focus light energy, including a camera to convert the received light energy into digital electronic data; and
a processor to compare the digital electronic data with information extracted from GPS/GNSS to determine vehicle attitude from the comparison, wherein the processor includes a GPS/GNSS satellite scheduler to provide feedback control to position the optical sensor towards a selected satellite.

13. The attitude determination system according to claim 12, wherein the camera further comprises
a photo-cathode,
a multi-channel plate,
a phosphor screen, and a fiber optic bundle to provide image gain for improving detection capability and measurement precision.

14. The attitude determination system according to claim 12, wherein the camera is a focal plane array.

15. The attitude determination system according to claim 12, further comprising:
a GPS/GNSS antenna to receive radio signals from one or more GPS/GNSS satellites; and
a GPS/GNSS receiver to convert the received radio signals into the GPS/GNSS information.

16. The attitude determination system according to claim 12, wherein the optical sensor is a gimbaled optical sensor.

17. The attitude determination system according to claim 12, wherein the camera is a CMOS focal plane array providing optical or UV streak detection of a selected satellite.

18. A method for determining refined attitude information for a vehicle, comprising:
receiving radio-frequency signals from a plurality of GPS/GNSS navigation satellites and applying a Kalman filter to determine expected position and motion of the vehicle from the received radio signals;
determining coarse attitude information for the vehicle;
selecting one or more satellites for refining the coarse attitude information of the vehicle;
determining expected angular position and motion of the selected one or more satellites relative to said vehicle, equipped by way of a GPS/GNSS antenna/receiver unit and an inertial navigation system;
measuring actual angular position and motion of the selected one or more satellites about two axes relative to the vehicle using an onboard electro-optical sensor and an inertial measurement unit;
computing a difference, along two axes, between the expected angular position and motion and the measured angular position and motion of the selected one or more satellites; and
refining the coarse attitude information from the computed difference.

19. The method for determining refined attitude information for a vehicle according to claim 18, wherein the coarse attitude information is derived from the received radio frequency signals.

20. The method for determining refined attitude information for a vehicle according to claim 18, wherein the coarse attitude information is derived from an onboard three axis magnetometer.

21. The method for determining refined attitude information for a vehicle according to claim 18, wherein the refined attitude information is vehicle attitude bias information derived from the computed difference.

22. The method for determining refined attitude information for a vehicle according to claim 21, wherein the attitude information comprises four quaternion parameters.

23. The method for determining refined attitude information for a vehicle according to claim 18, wherein a rate of change in vehicle attitude bias is determined from the computed difference.

24. The method for determining refined attitude information for a vehicle according to claim 23, wherein the rate of change in vehicle attitude bias comprises four quaternion rate parameters.

25. An onboard attitude determination system, comprising:
an optical sensor to receive and focus light energy, including a camera to convert the received light energy into digital electronic data; and
a processor to compare the digital electronic data with information extracted from GPS/GNSS to determine vehicle attitude from the comparison, wherein the processor includes a GPS/GNSS satellite scheduler and extracts sensor data within a region of interest defined by the scheduler.

26. The attitude determination system according to claim 25, wherein the optical sensor is a strap down electro-optical sensor unit having a plurality of electro-optical sensors.

* * * * *

UNITED STATES PATENT AND TRADEMARK OFFICE
CERTIFICATE OF CORRECTION

PATENT NO.   : 6,463,366 B2
DATED        : October 8, 2002
INVENTOR(S)  : Yasuhiro Kinashi et al.

It is certified that error appears in the above-identified patent and that said Letters Patent is hereby corrected as shown below:

<u>Title page,</u>
Insert Item: -- [73] Assignee: Schafer Corporation, Chelmsford, MA --
Insert Item: -- [74] *Attorney, Agent, or Firm*—Kramer & Associates, P.C. --

Signed and Sealed this

Fourth Day of February, 2003

JAMES E. ROGAN
*Director of the United States Patent and Trademark Office*